(12) United States Patent
Koch et al.

(10) Patent No.: US 8,567,030 B2
(45) Date of Patent: Oct. 29, 2013

(54) APPARATUS FOR FASTENING A MOUNTING RAIL TO A THREADED SHAFT

(75) Inventors: Bernd Koch, Wasserburg am Inn (DE); Hans Urban, Haag (DE)

(73) Assignee: Schletter GmbH, Kirchdorf (DE)

( * ) Notice: Subject to any disclaimer, the term of this patent is extended or adjusted under 35 U.S.C. 154(b) by 51 days.

(21) Appl. No.: 13/322,463

(22) PCT Filed: May 27, 2010

(86) PCT No.: PCT/DE2010/000580
§ 371 (c)(1),
(2), (4) Date: Mar. 7, 2012

(87) PCT Pub. No.: WO2010/136022
PCT Pub. Date: Dec. 2, 2010

(65) Prior Publication Data
US 2012/0167364 A1     Jul. 5, 2012

(30) Foreign Application Priority Data

May 27, 2009  (DE) .................... 20 2009 007 526 U

(51) Int. Cl.
*B25B 27/14*    (2006.01)
*E04C 2/38*     (2006.01)
*F16D 1/00*     (2006.01)
*F16G 11/00*    (2006.01)

(52) U.S. Cl.
USPC .................. 29/281.1; 52/717.03; 403/404

(58) Field of Classification Search
USPC ............ 29/281.1; 403/404, 409.1; 52/717.03, 52/745.05, 698, 173.3, 27
See application file for complete search history.

(56) References Cited

U.S. PATENT DOCUMENTS

| | | | | |
|---|---|---|---|---|
| 3,258,250 A | * | 6/1966 | McMullin | 256/13.1 |
| 3,842,564 A | * | 10/1974 | Brown | 52/717.03 |
| 5,499,762 A | * | 3/1996 | Lee | 224/321 |
| 5,746,029 A | * | 5/1998 | Ullman | 52/27 |
| 6,701,594 B2 | * | 3/2004 | Bruyn | 29/257 |
| 6,823,799 B2 | * | 11/2004 | Gleave | 104/111 |
| 7,634,875 B2 | * | 12/2009 | Genschorek | 52/173.3 |
| 8,051,976 B2 | * | 11/2011 | Koeda et al. | 198/860.1 |

(Continued)

FOREIGN PATENT DOCUMENTS

| | | |
|---|---|---|
| DE | 20 2004 015811 U1 | 12/2004 |
| DE | 20 2006 008 867 U1 | 2/2007 |

(Continued)

*Primary Examiner* — Lee D Wilson
*Assistant Examiner* — Alvin Grant
(74) *Attorney, Agent, or Firm* — Norman B. Thot

(57) ABSTRACT

An apparatus for fastening a mounting rail includes a retaining element comprising a supporting surface for a contact side of the mounting rail, a gripping extension projecting from the supporting surface which engages behind the retaining edge, a first elongated hole disposed transversely to the mounting rail configured to have a threaded shaft pass therethrough, and bracing slopes. A clamping element comprises a second elongated hole disposed transversely to the mounting rail configured to have the threaded shaft pass therethrough, and mating slopes. Nuts engage the threaded shaft. The retaining element and the clamping element are arranged axially between, and are braced together by, the nuts, so that the clamping element and the mounting rail advance toward each another and the mating slopes slide downward on the bracing slopes. The mounting rail is thereby clamped against the gripping extension by the clamping element and is held down on the supporting surface.

10 Claims, 6 Drawing Sheets

(56) References Cited

U.S. PATENT DOCUMENTS

| | | | |
|---|---|---|---|
| 8,240,109 B2 * | 8/2012 | Cusson et al. | 52/745.05 |
| 8,413,944 B2 * | 4/2013 | Harberts et al. | 248/500 |
| 8,448,407 B1 * | 5/2013 | Wiener | 52/745.21 |
| 2004/0216399 A1 * | 11/2004 | Yamada et al. | 52/173.1 |
| 2005/0102958 A1 * | 5/2005 | Anderson | 52/698 |
| 2007/0084504 A1 * | 4/2007 | Kobayashi et al. | 136/251 |
| 2008/0000173 A1 * | 1/2008 | Lenox et al. | 52/173.1 |
| 2008/0302407 A1 * | 12/2008 | Kobayashi | 136/251 |
| 2008/0310913 A1 | 12/2008 | Urban et al. | |
| 2011/0247295 A1 * | 10/2011 | Stearns et al. | 52/745.21 |
| 2012/0193310 A1 * | 8/2012 | Fluhrer et al. | 211/41.1 |
| 2012/0298817 A1 * | 11/2012 | West et al. | 248/220.22 |

FOREIGN PATENT DOCUMENTS

| | | |
|---|---|---|
| DE | 20 2007 008 471 U1 | 9/2007 |
| EP | 0 552 621 A1 | 7/1993 |
| EP | 1 647 782 A2 | 4/2006 |

* cited by examiner

APPARATUS FOR FASTENING A MOUNTING RAIL TO A THREADED SHAFT

CROSS REFERENCE TO PRIOR APPLICATIONS

This application is a U.S. National Phase application under 35 U.S.C. §371 of International Application No. PCT/DE2010/000580, filed on May 27, 2010 and which claims benefit to German Patent Application No. 20 2009 007 526.5, filed on May 27, 2009. The International Application was published in German on Dec. 2, 2010 as WO 2010/136022 A2 under PCT Article 21(2).

FIELD

The present invention provides an apparatus for fastening a mounting rail on a threaded shaft/shank, in particular that of a hanger bolt. Such apparatuses are often used for the substructure of solar modules on roofs.

BACKGROUND

DE 20 2006 008 867 U1 discloses an apparatus for fastening a solar installation on a roof. The apparatus comprises a hanger bolt, to the threaded shaft of which a flat metal connecting plate is screwed firmly by means of two nuts. The metal connecting plate has an elongated hole, on which a mounting rail can be fastened in an adjustable manner. A second screw is necessary for fastening the mounting rail.

DE 20 2007 008 471 U1 discloses an apparatus which can fix a profile rail to another component by means of a wedge, which is guided on a ramp, and just one screw. The apparatus is designed for a planar mounting base which is larger than the two-part rear surface of the apparatus. The distance between the screw and the profile rail is also fixedly predetermined.

SUMMARY

An aspect of the present invention is to provide an apparatus for fastening a mounting rail on a threaded shaft, wherein the apparatus does not require any of its own screws and where the mounting rail may be adjusted both axially and radially in relation to the threaded shaft.

In an embodiment, the present invention provides an apparatus for fastening a mounting rail comprising a contact side and a retaining edge on a threaded shaft which includes a retaining element comprising a supporting surface for the contact side of the mounting rail, a gripping extension projecting from the supporting surface and configured to engage behind the retaining edge, a first elongated hole disposed transversely to the mounting rail and configured to have the threaded shaft pass therethrough, and a plurality of successive bracing slopes arranged to slope up uniformly with increasing distance from the mounting rail. A clamping element comprises a second elongated hole disposed transversely to the mounting rail and configured to have the threaded shaft pass therethrough, and a plurality of successive mating slopes configured to correspond to the plurality of successive bracing slopes of the retaining element. At least two nuts are configured to engage the threaded shaft. The retaining element and the clamping element are arranged axially between the at least two nuts and are configured to be braced together by the at least two nuts at various positions along the threaded shaft. The bracing together of the at least two nuts causes the clamping element and the mounting rail to advance toward each another and the plurality of successive mating slopes of the clamping element to slide downward on the plurality of successive bracing slopes of the retaining element so that, when the at least two nuts are braced, the mounting rail is clamped against the gripping extension by the clamping element so as to be held down on the supporting surface.

BRIEF DESCRIPTION OF THE DRAWINGS

The present invention is described in greater detail below on the basis of embodiments and of the drawings in which.

DETAILED DESCRIPTION

Figure 1:
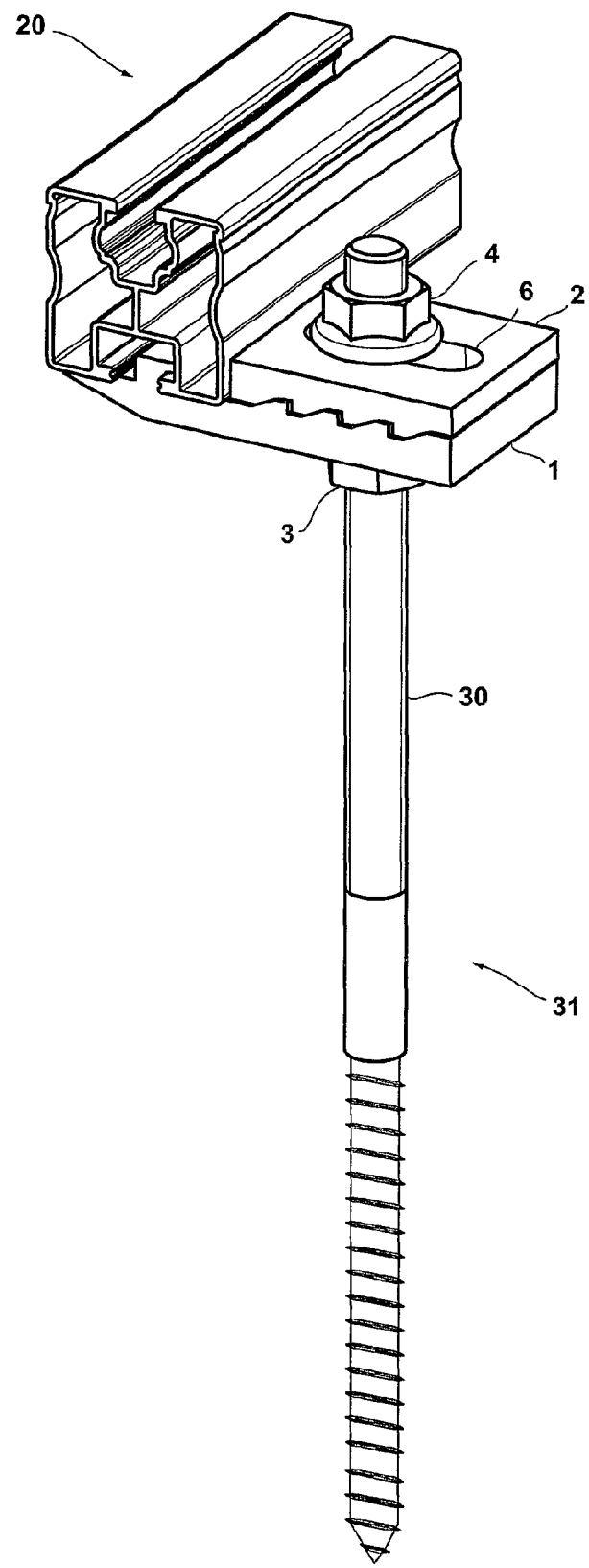
FIG. 1 shows an apparatus arranged on a hanger bolt and retaining a mounting rail.

In an embodiment of the present invention, the apparatus is provided for fastening a mounting rail on a threaded shaft, wherein the mounting rail comprises a contact side and a retaining edge. Such a retaining edge may, for example, be provided laterally. The retaining edge can at the same time be the edge of an undercut screw-connection channel in the contact side of the mounting rail. The threaded shaft for the apparatus may be arranged at a fixed location and may be, for example, that of a hanger bolt.

The apparatus comprises a retaining element, a clamping element and two nuts, wherein the retaining element has a supporting surface for the contact side of the mounting rail and a gripping extension, which projects in relation to the supporting surface and is configured engage behind the retaining edge. It is possible for the gripping extension to be configured cross-sectionally, like a hook and to have a joining slope. The threaded shaft passes through the retaining element in a first elongated hole and through the clamping element in a second elongated hole, wherein the two elongated holes are directed transversely to the applied mounting rail. It is also provided that the retaining element and the clamping element are arranged axially between the two nuts, which engage with the threaded shaft, and can be braced together by means of these nuts at various positions along the threaded shaft.

In an embodiment of the present invention, an axial bracing causes the clamping element and the mounting rail to advance toward one another radially. For this purpose, the retaining element comprises a plurality of successively arranged bracing slopes, which slope up uniformly with increasing distance from the mounting rail and onto which the clamping element can slide downward by means of corresponding mating slopes. With nuts braced in relation to one another, the mounting rail is then clamped against the gripping extension by the clamping element and is held down on the supporting surface by the gripping extension.

In an embodiment of the present invention, the threaded shaft and the nuts can be used both for fastening the apparatus and, indirectly, for fixing the mounting rail in place so as to facilitate assembly. A screw dedicated for fastening the mounting rail is no longer necessary. By means of the two elongated holes, which are oriented in the same direction, it is possible for the retaining element together with the clamping element to be displaced radially as a single unit in relation to the threaded shaft. The wedge and the ramp of the apparatus known from the prior art are unsuitable for this purpose since, provided with corresponding elongated holes, they would be disadvantageously high. The fact that in each case a plurality of successively arranged bracing and mating slopes, which act as a sliding pairing, are provided according to the present invention means that it is possible for both the retaining element and the clamping element, despite the radial adjustment range, to be configured in a flat, and thus material-saving, manner, for example, in the form of extrusions with punched elongated holes. The apparatus can also be braced together by the two nuts, as required, at any desired position along the threaded shaft.

In an embodiment of the present invention, the bracing slopes and the mating slopes can be straightforwardly configured in cross section like sawtooth profiles with an asymmetric flank pattern, wherein upwardly sloping and downwardly sloping flanks may be spaced apart from one another, for example, by slope-free portions. In an embodiment of the present invention, the clamping element can have a second group of mating slopes, which can be arranged symmetrically in relation to the first mating slopes, and therefore the clamping element can be mounted in a manner in which it is rotated alternately through 180° about the threaded shaft. The first and second mating slopes can then be viewed, in cross section, as a symmetrical sawtooth profile or, for example, with slope-free portions, as a symmetrical trapezoidal profile. In order to achieve constant sliding and clamping conditions over the entire adjustment range of the elongated holes irrespective of the profile shape selected, the bracing and mating slopes can, for example, be arranged mostly around the region of the elongated holes.

In an embodiment of the present invention, the apparatus can comprise a resilient element which biases the clamping element in a direction which slopes up in relation to the bracing slopes. This allows the apparatus to be kept open automatically for the purpose of placing the mounting rail in position.

The apparatus according to FIG. 1 comprises a retaining element 1, a clamping element 2 and two nuts 3 and 4. The apparatus is used to fasten a mounting rail 20, only part of which is illustrated here, on the threaded shaft 30 of a conventional hanger bolt 31. The axis of the threaded shaft 30 here crosses the mounting rail 20 outside the same, and in a right angle thereto. The hanger bolt 31 may have its cutting thread, which is provided at the bottom, arranged at a fixed position, for example on a wooden roof rafter.

Figure 2A:
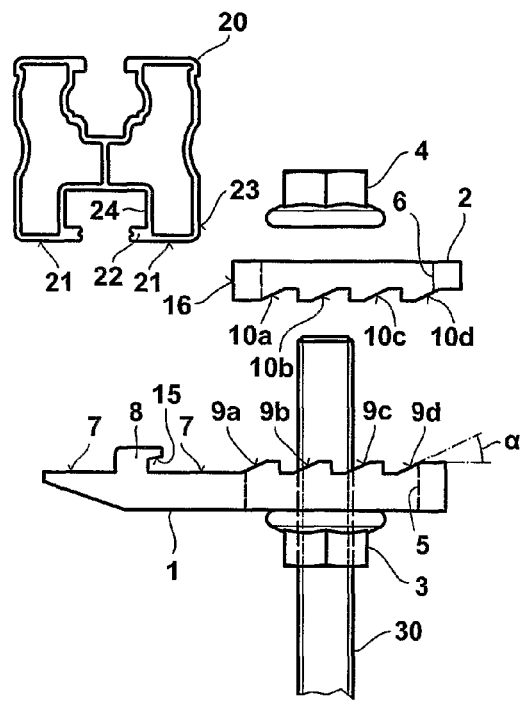
FIGS. 2a to 2d show the sequence for assembling the apparatus according to FIG. 1.

As can also be seen particularly from FIG. 2a, the mounting rail 20 has a contact side 21 with an undercut screw-connection channel 24, which subdivides the contact side 21 into two halves of approximately equal width. That opening edge of the undercut screw-connection channel 24 which is closer to the threaded shaft 30 is provided as a retaining edge 22 for the apparatus. Moreover, a part of the right-hand outer side of the mounting rail 20, this right-hand outer side being directed toward the threaded shaft 30, is provided as a clamping portion 23 for the apparatus, wherein the clamping portion 23 and the contact side 21 are perpendicular to one another. A likewise undercut screw-connection channel can be seen on the upper side of the mounting rail 20, this upper side being located opposite to the contact side 21. This screw-connection channel can be used for mounting further components. Such components may, for example, be so-called module clamps for the further fastening of photovoltaic modules, as described, for example, in DE 20 2006 008 867 U1.

FIG. 2a also shows that the retaining element 1 has a supporting surface 7 for the contact side 21 of the mounting rail 20 and also a gripping extension 8, which projects in relation to the supporting surface 7 and is configured for engaging behind the retaining edge 22. The gripping extension 8 can be seen as a hook in cross section and acts in relation to the retaining edge 22 like a hook, which is open toward the threaded shaft 30. The gripping extension also has a joining slope 15, beneath which the retaining edge 22 can be straightforwardly pushed like a form-closure connection, as can be seen in the final-assembly state according to FIG. 2d. The joining slope 15 and the retaining edge 22 are moreover configured such that the mounting rail 20, even in the case of a sloping arrangement, is already retained with provisional clamping action on the gripping extension 8, which is advantageous for mounting on a pitched roof. It can also be seen that the gripping extension 8 subdivides the supporting surface 7 into two portions, and these portions carry the contact side 21 of the mounting rail 20 in a statically advantageous manner on either side of the undercut screw-connection channel 24.

Figure 2B:
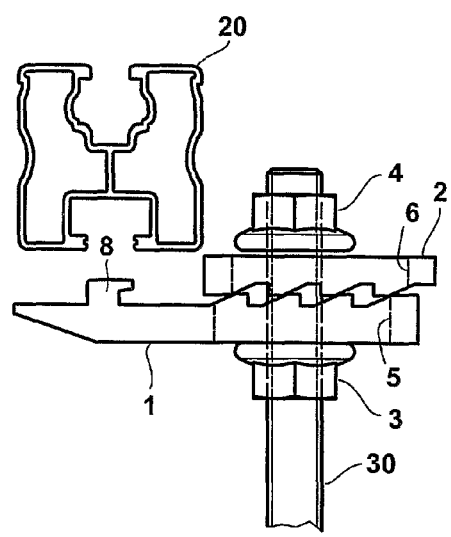

If the apparatus is assembled according to FIG. 2b, the threaded shaft 30 passes through the retaining element in a first elongated hole 5 and through the clamping element in a second elongated hole 6, wherein the two elongated holes 5 and 6 are directed transversely to the placed-in-position mounting rail 20, and the retaining element 1 and the clamping element 2 are arranged axially between the two nuts 3 and 4 which engage with the threaded shaft 30. In the final-assembly state according to FIG. 2d, the retaining element 1 and the clamping element 2 are then braced together by means of the nuts 3 and 4 at one of a number of positions along the threaded shaft 30. For this purpose, the rear sides of the retaining element 1 and of the clamping element 2 are planar and are both perpendicular to the axis of the threaded shaft 30, and therefore the nuts 3 and 4 can there come suitably into abutment. Both the retaining element 1 and the clamping element 2 are configured as flat extrusions, wherein the elongated holes 5 and 6 can be provided, for example, by punching.

In order that axial bracing together results in the clamping element 2 and the mounting rail 20 advancing toward one another radially, the retaining element 1, as can be seen, once again, from FIG. 2a, has four successively arranged bracing slopes 9a to 9d, which slope up uniformly with increasing distance from the mounting rail 20 and on which the clamping element 2 can slide downward. For this purpose, the clamping element 2 has four corresponding mating slopes 10a to 10d, which form sliding pairings with the bracing slopes 9a to 9d, respectively, and therefore the clamping element 2 can be displaced smoothly in relation to the retaining element 1. According to the assembly step from FIG. 2c to FIG. 2d, an axial movement of the clamping element 2 towards the retaining element 1 here results in the clamping element 2 being moved radially towards the clamping portion 23 of the mounting rail 20. With nuts 3 and 4 braced in relation to one another according to FIG. 2d, the mounting rail 20, finally, is clamped against the gripping extension 8 by the one face side 16 of the clamping element 2 and, in addition, is held down on the supporting surface 7 by the gripping extension 8.

The bracing slopes 9a to 9d and the mating slopes 10a to 10d can be seen cross-sectionally according to FIG. 2a as corresponding sawtooth profiles with an asymmetric flank pattern, wherein upwardly sloping and downwardly sloping flanks are spaced apart by slope-free portions. The bracing slopes 9a and 9d are configured uniformly. They thus have a uniform upward slope cc of, in this case, about 25° in relation to a plane which is perpendicular to the threaded shaft 30. The rear or downwardly sloping flanks are arranged vertically to this plane. It can also be seen that the bracing slopes 9a to 9d begin and end on the same level and are spaced apart at equal intervals from one another. The mating slopes 10a to 10d on the clamping element 2 are configured correspondingly and/or form a matching mating shape.

Figure 2C:
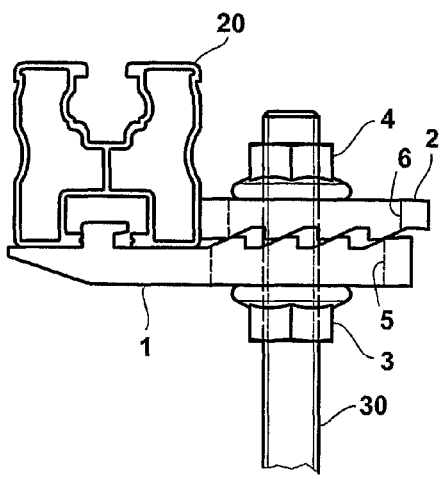
Figure 2D:
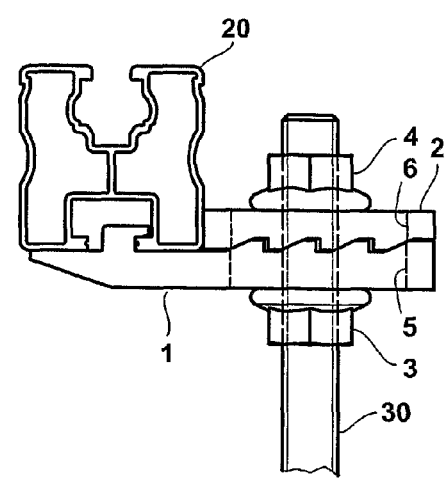

In order that the clamping element 2, once placed in position on the threaded shaft 30 according to FIG. 2b, does not, according to FIG. 2c, slide downward automatically along the bracing slopes 9a to 9d and block the mounting rail 20 from being placed in position as a result, the clamping element 2 can easily be held back manually during assembly. In a further development which is not specifically illustrated, it is also possible for the apparatus to comprise a resilient element, which biases the clamping element 2 and retains the same compliantly in an upper portion on the bracing slopes 9a to 9d. It is only when the nut 4 is tightened that the clamping element 2 is then displaced downward, and/or toward the mounting rail 20, against to the resilient force of this resilient element.

As an alternative to the assembly step from FIG. 2a to FIG. 2c, it is also possible to place the mounting rail 20 in position on the retaining element 1 at first and to place the clamping element 2 and the nut 4 in position on the threaded shaft 30 subsequently. The assembly sequence as illustrated, however, allows for the arrangement of the apparatus beforehand on a non-fixed hanger bolt and to provide the fitter therefore with a pre-assembled assembly. A pre-assembly position similar to that according to FIG. 2b, and possibly achieved by the aforementioned resilient element, is here expedient.

Figure 3A:
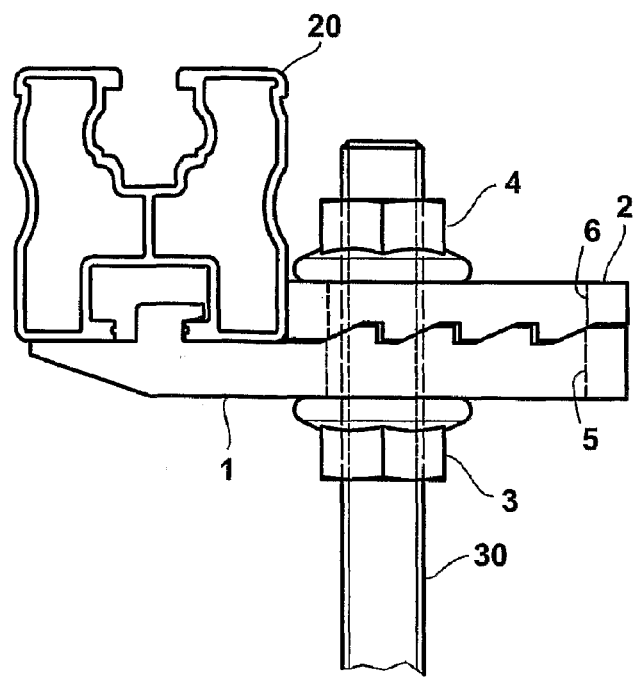
FIGS. 3a and 3b show the transverse and longitudinal adjustability of the apparatus according to FIG. 1 in relation to the hanger bolt.
Figure 3B:
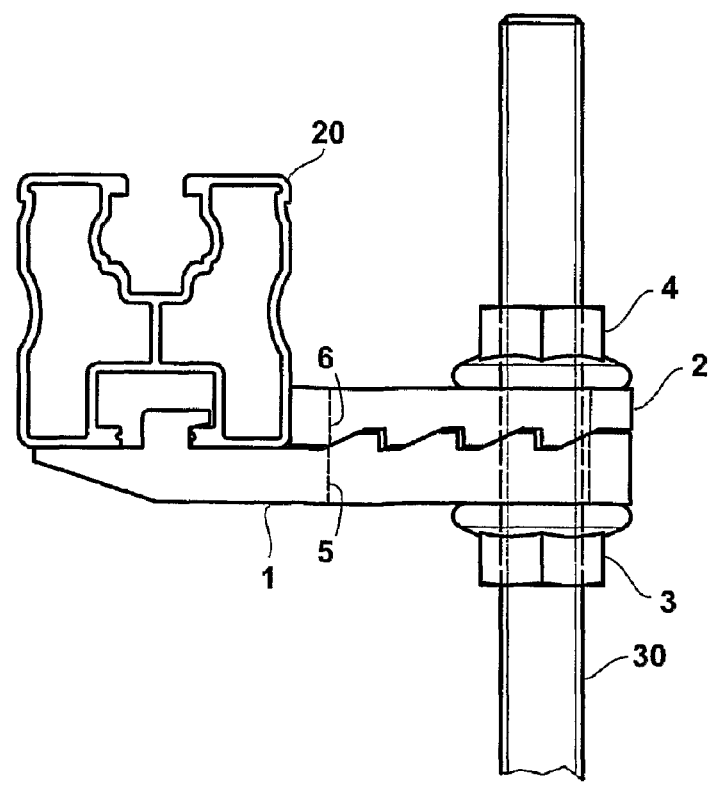

FIGS. 3a and 3b show the radial and axial adjustability of the apparatus. The mounting rail 20 can be mounted at different distances from the threaded shaft 30 by means of the apparatus according to FIG. 1. FIG. 3a thus shows a position at a small distance, and FIG. 3b shows a position at a larger distance, from the threaded shaft 30. This is expedient if a relatively long mounting rail is to be fastened on a plurality of threaded shafts which are not precisely in alignment. The extent of this radial adjustability is determined substantially by the length of the elongated holes 5 and 6. It is also advantageous in this context for the bracing slopes 9a to 9d and the mating slopes 10a to 10d to be arranged around the region of the elongated holes 5 and 6, and therefore the clamping element 2, during bracing, does not tilt in relation to the retaining element 1, and similar sliding and clamping conditions prevail along the elongated holes 5 and 6. In the final-assembly state, the elongated holes 5 and 6 are approximately congruent, wherein it is also conceivable for these elongated holes to be rendered congruent for a maximum adjustment range in the position according to FIG. 2b.

As can be seen, in addition, from FIGS. 3a and 3b, the apparatus according to FIG. 1 may also be arranged at various positions along the threaded shaft 30. FIG. 3a thus shows a position at a small distance, and FIG. 3b shows a position at a relatively large distance from the free end 32 of the threaded shaft 30. This is expedient if a relatively long mounting rail is to be fastened on a plurality of threaded shafts which do not end precisely in the same plane, as may be the case, for example, if there is an uneven underlying surface or where hanger bolts are screwed in to different depths. The longer a threaded shaft, the larger the axial adjustment range over which the retaining element 1 and the clamping element 2 can be braced in relation to one another by means of the nuts 3 and 4. In addition to the radial and axial adjustability, the apparatus according to FIG. 1 can also be rotated about the axis of the threaded shaft 30.

Figure 4:
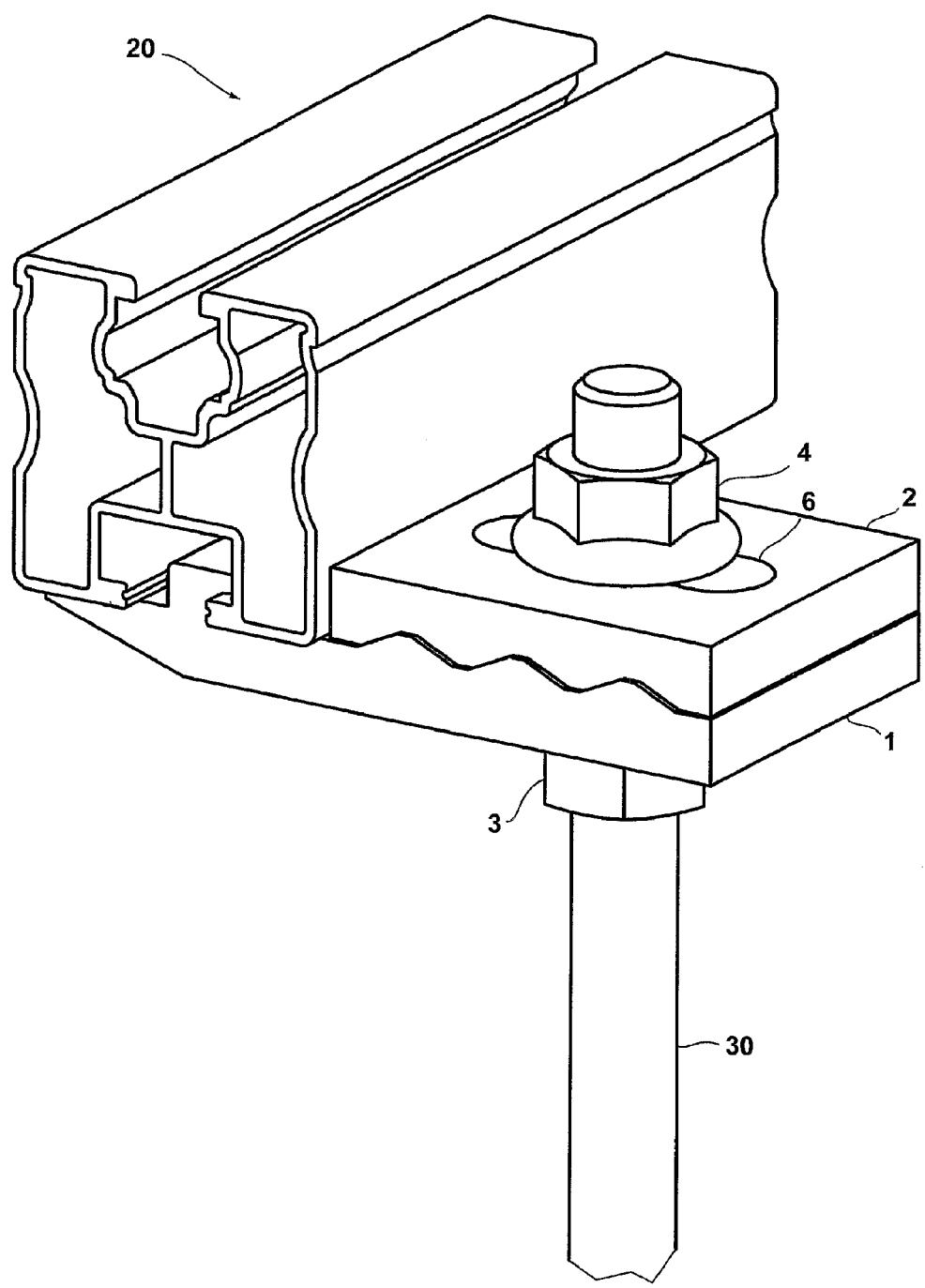
FIG. 4 shows a further apparatus arranged on a hanger bolt and retaining a mounting rail.
Figure 5A:
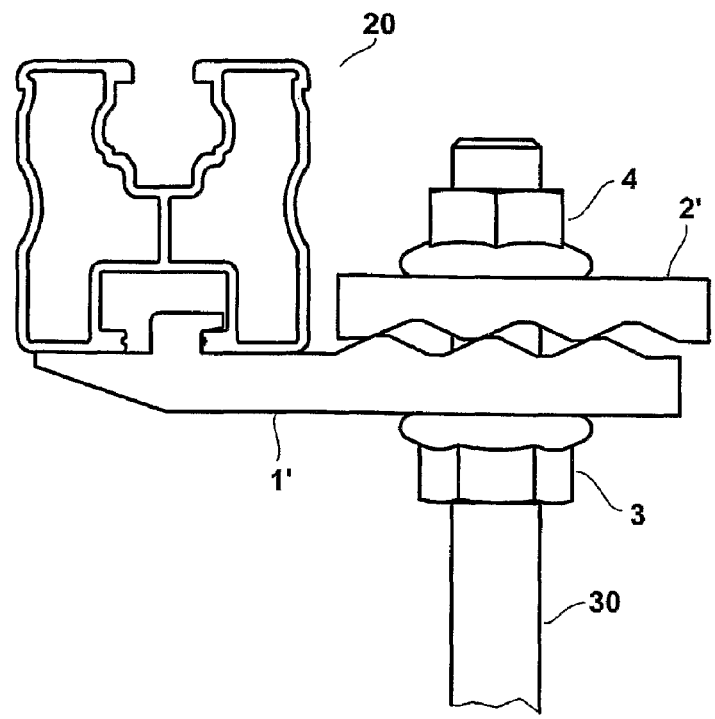
FIGS. 5a and 5b show the final step for assembling the apparatus according to FIG. 4.
Figure 5B:
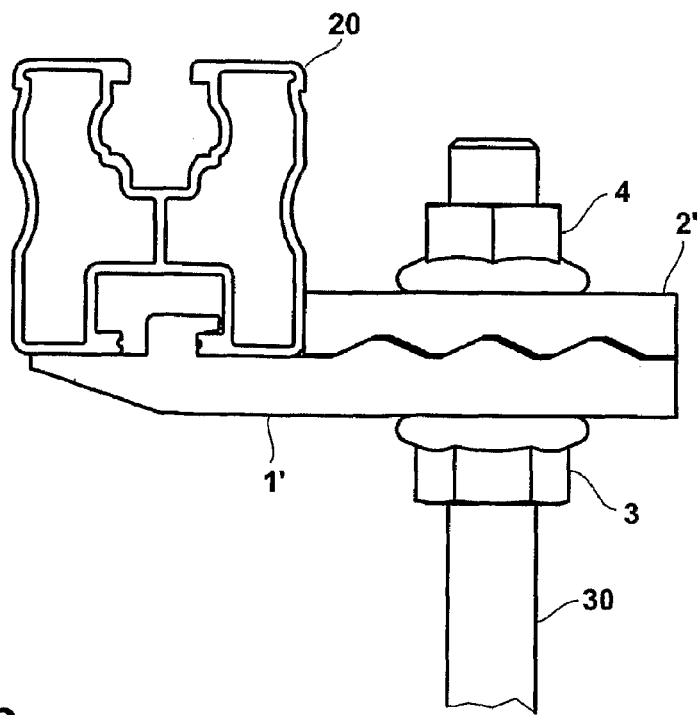
Figure 6:
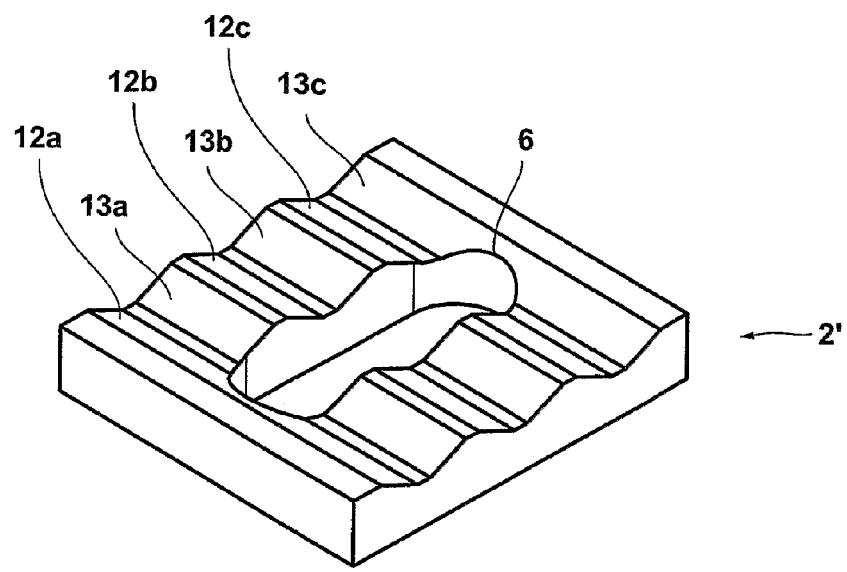
FIG. 6 shows the turned-over clamping element of the apparatus according to FIG. 4.
Figure 7:
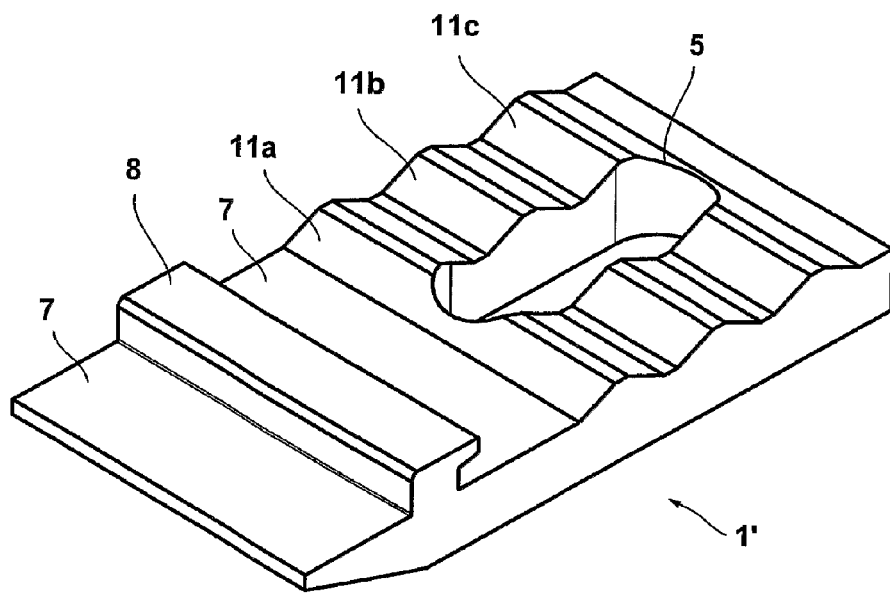
FIG. 7 shows the retaining element of the apparatus according to FIG. 4.

FIG. 4 shows a further apparatus according to the present invention, which is comparable to the apparatus according to FIG. 1. As can be seen, in particular, from FIGS. 6 and 7, the retaining element 1' has three bracing slopes 11a to 11c and the clamping element 2' has three mating slopes 12a to 12c. The fundamental difference from the apparatus according to FIG. 1 is that the clamping element 2' has a second group of three mating slopes 13a to 13c, which are arranged symmetrically in relation to the first mating slopes 12a to 12c. The first and the second mating slopes 12a to 12c and 13a to 13c can thus be seen cross-sectionally as a symmetrical trapezoidal profile. This means that the clamping element 2' can also be mounted in a manner in which it is rotated through 180° about the threaded shaft 30, which facilitates assembly on site, for example, on a roof. It can also clearly be seen from FIGS. 6 and 7 that, as with the apparatus according to FIG. 1, the bracing slopes and mating slopes are arranged around the region of the elongated holes 5 and 6, respectively. FIGS. 5a and 5b, finally, show, in a manner comparable to FIGS. 2c and 2d, the final assembly step for the apparatus according to FIG. 4, wherein, in this case, the mounting rail 20 already has the retaining edge pushed manually beneath the gripping extension of the retaining element.

The present invention is not limited to embodiments described herein; reference should be had to the appended claims.

What is claimed is:

1. An apparatus for fastening a mounting rail comprising a contact side and a retaining edge on a threaded shaft, the apparatus comprising:
    a retaining element comprising:
        a supporting surface for the contact side of the mounting rail,
        a gripping extension projecting from the supporting surface and configured to engage behind the retaining edge,
        a first elongated hole disposed transversely to the mounting rail and configured to have the threaded shaft pass therethrough, and
        a plurality of successive bracing slopes arranged to slope up uniformly with increasing distance from the mounting rail;
    a clamping element comprising:
        a second elongated hole disposed transversely to the mounting rail and configured to have the threaded shaft pass therethrough, and
        a plurality of successive mating slopes configured to correspond to the plurality of successive bracing slopes of the retaining element; and
    at least two nuts configured to engage the threaded shaft,
    wherein the retaining element and the clamping element are arranged axially between the at least two nuts and are configured to be braced together by the at least two nuts at various positions along the threaded shaft, the bracing together of the at least two nuts causing the clamping element and the mounting rail to advance toward each another and the plurality of successive mating slopes of the clamping element to slide downward on the plurality of successive bracing slopes of the retaining element so that, when the at least two nuts are braced, the mounting rail is clamped against the gripping extension by the clamping element so as to be held down on the supporting surface.

2. The apparatus as recited in claim 1, further comprising a hanger bolt, wherein the hanger bolt comprises the threaded shaft.

3. The apparatus as recited in claim 1, wherein the retaining edge is an edge of an undercut screw-connection channel in the contact side of the mounting rail.

4. The apparatus as recited in claim 1, wherein the retaining element is provided as an extrusion from which the first elongated hole is punched.

5. The apparatus as recited in claim 1, wherein the clamping element is provided as an extrusion from which the second elongated hole is punched.

6. The apparatus as recited in claim 1, wherein the plurality of successive bracing slopes are substantially arranged around a region of the first elongated hole.

7. The apparatus as recited in claim 1, wherein the plurality of successive mating slopes are substantially arranged around a region of the second elongated hole.

8. The apparatus as recited in claim 1, wherein the clamping element further comprises a plurality of second mating slopes arranged symmetrically with respect to the plurality of first mating slopes so that the clamping element can be mounted in a manner in which it is rotated alternately through 180° about the threaded shaft.

9. The apparatus as recited in claim 1, wherein the apparatus further comprises a resilient element configured to bias the clamping element in a direction which slopes up with respect to the plurality of successive bracing slopes.

10. An assembly comprising the apparatus as recited in claim 1, wherein the apparatus is pre-assembled on a hanger bolt comprising the threaded shaft.

* * * * *